Nov. 23, 1926.
E. H. PLASS
1,608,422
FRUIT PACKAGE FACING SUPPORT
Filed Jan. 11, 1926
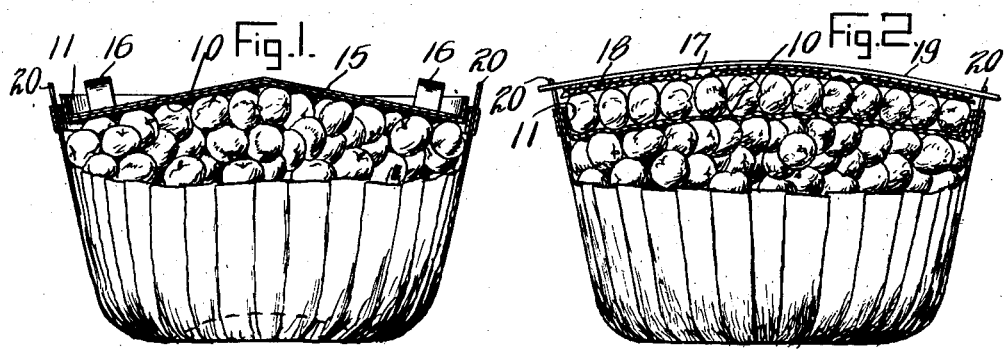
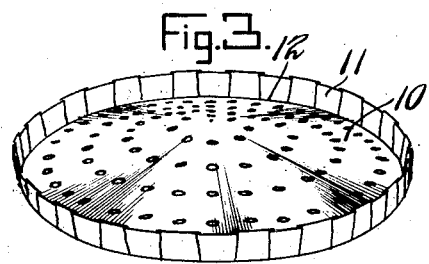
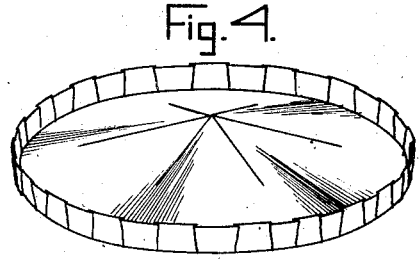
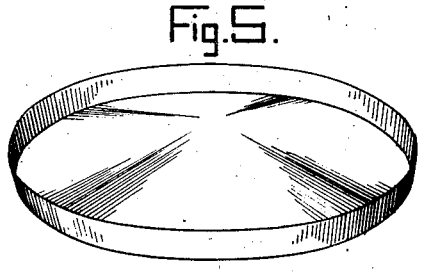
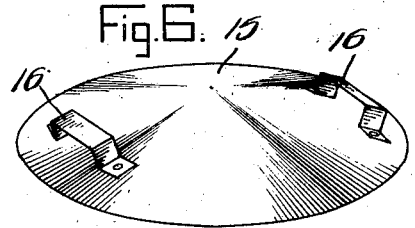
Inventor
Edward H. Plass
By
Attorney Patented Nov. 23, 1926.

1,608,422

UNITED STATES PATENT OFFICE.

EDWARD H. PLASS, OF VINCENNES, INDIANA, ASSIGNOR TO H. PLASS & SONS (A FIRM COMPOSED OF HENRY PLASS, EDWARD H. PLASS, AND FRANK F. PLASS), OF VINCENNES, INDIANA.

FRUIT-PACKAGE FACING SUPPORT.

Application filed January 11, 1926. Serial No. 80,641.

In packing fruit for shipment, particularly in packing apples, peaches, etc., in baskets, it is desirable to make the top of the basket of an attractive appearance and it has been customary to arrange the top layer of the fruit by sorting the apples or other fruit on edge in circular rows so that when the cover is removed the top of the basket presents an even and attractive appearance. This work is commonly called "ring facing" and requires considerable experience and skill in order to do the work rapidly and effectively.

In such work it is customary to fill the basket except for the space required for the top layer, then hold a facing plate or face forming plate (sometimes called a "shaker") over the top of the basket and down upon the surface of the fruit and shake the fruit gently until it has settled down as compactly as possible without bruising the fruit. This facing plate is commonly of metal and slightly cone-shaped corresponding to the usual cone-shaped form of the bottom of the basket (although both the basket bottom and plate may be flat) and when removed the top of the fruit is usually arched or higher in the center of the basket than at the edges. On this top is then placed the facing layer of fruit laid edgewise.

This method has been employed heretofore and is one of common practice but results frequently in the bruising of the fruit, particularly at the edges of the basket where the fruit contacts with the rim and, moreover, in shipment the surface layer frequently becomes somewhat displaced and the fruit out of the order in which it was arranged before shipment, impairing its appearance when opened.

My invention consists in employing a support and retainer for this facing layer of a material and character which will protect the fruit and not only facilitate the operation of laying the face of the basket but will also insure that the facing layer will remain in the form in which it is laid during shipment; and also protect the fruit against bruising and afford other advantages which will be hereinafter described.

Referring to the accompanying drawings which are made a part hereof and on which similar reference characters indicate similar parts, Figure 1 represents a basket of apples filled substantially as it appears before it is shaken down and showing the facing plate in the position it occupies while in use thereon, Figure 2, a similar view showing a basket that has been packed by the use of my invention and is ready for shipment. In both views the upper part of the basket is shown broken away or in section to illustrate the use of the invention more clearly, Figure 3, a perspective view showing one of my facing supports of preferred form, Figures 4 and 5, similar views showing modified forms of said facing support, and Figure 6, a perspective view showing the metal face forming plate.

Said support consists of a paper disk 10 (preferably perforated) the edge 11 of which is cut back by numerous slits appropriately spaced to a point 12 on a circular line representing the interior diameter of the top of the basket. The portion outside of said point 12 is bent up to form a rim which will slide down inside of the rim of the basket. The disk is preferably perforated to form air circulation which is desirable in shipping the fruit in refrigerator cars.

The disk shown in Fig. 4 is of a form similar to that shown in Fig. 3 except that instead of the disk being perforated it is slotted to permit sections to bend or flex over the apples beneath. Fig. 5 illustrates a similar support except it is molded or pressed and is solid and imperforate, and Fig. 6 a perspective view showing the facing plate, or face forming plate, that is commonly used in the operation.

In operation the basket is filled as shown in Fig. 1, the facing plate 15 is placed over the top of the fruit in the basket and the operator lifts the basket by the edges holding the plate down with his hands by using handles 16, and shakes the fruit gently and at the same time presses the plate downwardly until the fruit is compactly positioned in the basket and its top arched to conform with the cone-shaped plate. Before the plate is placed upon the top of the fruit it is placed within the facing support 10 which affords a soft surface to bear upon the face of the fruit. When the plate is removed said support 10 remains within the basket and is in a position to receive and support the top or facing layer of fruit which is then arranged in position as shown in Fig. 2, after which a corrugated paper packing 17 is placed over the top of the fruit, the lid 18 applied and secured by flexible bars 19 extending across said lid and through the handles 20 of the basket.

By the use of my invention the top layer of fruit is held in perfect arrangement during shipment and is protected against injury. Its use is also of much assistance in the work of "facing", and when the package is opened it enables a large surface of the fruit beneath to be readily exposed to inspection.

It will be understood, of course, that this facing support may be of various forms some of which are illustrated, but that my invention is not limited to any of the specific forms but is as broad as defined in the appended claims. It will also be understood that the word "basket" as used in the specification and claims is intended to signify any appropriate container such as a basket, barrel, crate or like device.

Having thus fully described my said invention, what I claim as new and desire to secure by Letters Patent, is:

1. A fruit package comprising a container a body of fruit in said container shaken to conform to an arched facing plate and an arched element resting upon said body of fruit and supporting a facing layer of fruit in arched position, substantially as set forth.

2. A process of packing fruit for shipment comprising partly filling a container with fruit, applying a lined facing plate upon the contents of the container shaking said contents to cause them to conform to the facing plate, removing the said facing plate but leaving the lining on the body of the fruit, placing a layer of fruit on said lining and applying a cover to said container, substantially as set forth.

3. A fruit package comprising a container having a body of fruit packed therein to present a rounded top surface, a concaved sheet of flexible material resting on the top of the body of fruit in the container, a top or facing layer of fruit on the sheet, said sheet having an upturned edge to protect said facing layer from the rim of the container, substantially as set forth.

4. A fruit package facing support comprising a sheet of flexible material arched adjacent its intermediate portion and having its margin upturned said support being arranged to separate an upper layer in a fruit package from the main body of the fruit whereby the fruit will present an even attractive appearance and be protected underneath and at the sides by said support, substantially as set forth.

In witness whereof, I have hereunto set my hand and seal at Washington, District of Columbia, this 9th day of January, A. D. nineteen hundred and twenty-six.

EDWARD H. PLASS. [L. S.]